US012173625B2

(12) United States Patent
Agarwal et al.

(10) Patent No.: US 12,173,625 B2
(45) Date of Patent: Dec. 24, 2024

(54) METHOD AND SYSTEM FOR OPTIMIZATION OF COMBINATION CYCLE GAS TURBINE OPERATION

(71) Applicant: Tata Consultancy Services Limited, Mumbai (IN)

(72) Inventors: Shashank Agarwal, Pune (IN); Sri Harsha Nistala, Pune (IN); Venkataramana Runkana, Pune (IN); Balaji Selvanathan, Pune (IN); Kalyani Zope, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 412 days.

(21) Appl. No.: 17/596,817

(22) PCT Filed: Jun. 20, 2020

(86) PCT No.: PCT/IN2020/050544
§ 371 (c)(1),
(2) Date: Dec. 17, 2021

(87) PCT Pub. No.: WO2020/255173
PCT Pub. Date: Dec. 24, 2020

(65) Prior Publication Data

US 2022/0235676 A1 Jul. 28, 2022

(30) Foreign Application Priority Data

Jun. 20, 2019 (IN) ............................ 201921024605

(51) Int. Cl.
*F01K 23/10* (2006.01)
*F01K 13/02* (2006.01)

(52) U.S. Cl.
CPC ............ *F01K 23/101* (2013.01); *F01K 13/02* (2013.01); *F05D 2220/722* (2013.01);
(Continued)

(58) Field of Classification Search
None
See application file for complete search history.

(56) References Cited

U.S. PATENT DOCUMENTS 7,980,053 B2 7/2011 Yakushi et al.
8,412,384 B2 4/2013 Nagafuchi et al.
(Continued)

FOREIGN PATENT DOCUMENTS

EP 3058203 B1 11/2017
JP 2009030476 A 2/2009
(Continued)

OTHER PUBLICATIONS

GE, "GE Digital Twin Analytic Engine for the Digital Power Plant", GE Research, Date: 2016, Publisher: GE, https://www.ge.com/digital/sites/default/files/download_assets/Digital-Twin-for-the-digital-power plant-.pdf.
(Continued)

*Primary Examiner* — David Earl Ogg
(74) *Attorney, Agent, or Firm* — Finnegan, Henderson, Farabow, Garrett & Dunner, LLP

(57) ABSTRACT

Combined cycle gas turbine (CCGT) power plants have become common for generation of electric power due to their high efficiencies. There are various problem related with improving the efficiency of CCGT plants by optimizing the manipulated variables. The method and system for optimizing the operation of a combined cycle gas turbine has been provided. The system is configured to calculate an optimal value of manipulated variables (MV) with efficiency as one of the key performance parameters. The MVs from the existing CCGT automation system, i.e. a first set of manipulated variables and the manipulated variables from the optimization approach, i.e. a second set of manipulated variables are combined to determine an optimal set of manipulated variables. The method further checks for the
(Continued)

anomalous behavior of the system and define the root cause of the identified anomaly and the operational state of the CCGT plant.

14 Claims, 11 Drawing Sheets

(52) U.S. Cl.
CPC .. *F05D 2260/2322* (2013.01); *F05D 2260/80* (2013.01); *F05D 2260/85* (2013.01); *F05D 2270/053* (2013.01); *F05D 2270/709* (2013.01)

(56) References Cited

U.S. PATENT DOCUMENTS

| | | | | |
|---|---|---|---|---|
| 8,881,498 | B2 | 11/2014 | Olia et al. | |
| 9,945,264 | B2 | 4/2018 | Wichmann et al. | |
| 2009/0138324 | A1 | 5/2009 | Nagafuchi et al. | |
| 2009/0320493 | A1 | 12/2009 | Olia et al. | |
| 2015/0184549 | A1 | 7/2015 | Pamujula et al. | |
| 2015/0185716 | A1* | 7/2015 | Wichmann | F02C 9/28 700/287 |
| 2016/0281607 | A1* | 9/2016 | Asati | F02C 7/26 |
| 2017/0016354 | A1* | 1/2017 | Zhang | F01K 13/02 |
| 2018/0313224 | A1 | 11/2018 | Nanda et al. | |

FOREIGN PATENT DOCUMENTS

| | | | |
|---|---|---|---|
| WO | WO 2015/035134 | A1 | 3/2015 |
| WO | WO 2018/181009 | A1 | 10/2018 |

OTHER PUBLICATIONS

International Search Report and Written Opinion mailed Jan. 5, 2021, in International Application No. PCT/IN2020/050544; 8 pages.

* cited by examiner

METHOD AND SYSTEM FOR OPTIMIZATION OF COMBINATION CYCLE GAS TURBINE OPERATION

CROSS-REFERENCE TO RELATED APPLICATIONS AND PRIORITY

This application is a US National Stage Filing and claims priority from International Application No. PCT/IN2020/050544, filed on Jun. 20, 2020, which application claims priority from Indian patent application No. 201921024605, filed on Jun. 20, 2019. The entire contents of the aforementioned applications are incorporated herein by reference.

TECHNICAL FIELD

The disclosure herein generally relates to the field of a combined cycle gas turbine power plants, and, more particularly, to a method and system for optimization of the combined cycle gas turbine operation by calculating optimal values of manipulated variables.

BACKGROUND

In recent years, combined cycle gas turbine (CCGT) power plants have become common for generation of electric power due to their high efficiencies compared to conventional coal-fired power plants. Combined cycle gas turbine plant is a complex system involving multiple units with different process dynamics. Historically, a lot of work has been done on plant automatic and control systems to improve overall performance of CCGT plants. Existing control systems in CCGT plants are 'mode-based' and consider power generated (to meet load demand) as one of the most important performance parameters to be tracked. Putting greater emphasis of meeting load demand often leads to lower efficiency, particularly with fluctuating load demand.

Another approach for improving the performance of the CCGT plant is via process optimization wherein optimal settings of manipulated variables such as fuel control valve opening, inlet guide vane angle, etc. can be obtained using behavioral models of CCGT plant. However, the state of operation in CCGT plants changes from steady to unsteady and vice versa quite frequently owing to fluctuating load demand and inherent dynamics of the units. CCGT plants are also prone to process and equipment anomalies wherein key parameters drift from their expected behavior and may lead to an unplanned shutdown. Application of process optimization without identifying the state of operation (steady vs unsteady and normal vs anomalous) may lead to sub-optimal or even erroneous settings of manipulated variables. Further, due to the complex nature of the CCGT operation, it is risky to implement the optimal settings from process optimization without reconciling them with the settings of manipulated variables prescribed by the control system at a very high frequency.

Also, there are various variables in the units of a CCGT plant that cannot be measured physically (e.g. turbine inlet temperature) but have significant impact on plant performance. Indirect estimation of such variables may improve recommendations from process optimization.

SUMMARY

Embodiments of the present disclosure present technological improvements as solutions to one or more of the above-mentioned technical problems recognized by the inventors in conventional systems. For example, in one embodiment, a system for optimizing the operation of a combined cycle gas turbine (CCGT) plant, the system comprises an input/output interface, one or more hardware processors and a memory in communication with the one or more hardware processors, wherein the one or more first hardware processors are configured to execute programmed instructions stored in the memory, to receive a plurality of data from a one or more databases of the CCGT plant at a predetermined frequency, wherein the plurality of data comprises of a real-time and a non-real-time data; preprocess the plurality of data; estimate a set of soft sensor parameters using a plurality of soft sensors; integrate the set of soft sensor parameters with the pre-processed plurality of data, wherein the integrated data comprises of first set of manipulated variables; detect process and equipment anomalies related to the CCGT plant and individual units of the CCGT plant, using a plurality of anomaly detection models, wherein the plurality of anomaly detection models are retrieved from the database; identify at least one cause of the detected anomalies using the plurality of anomaly diagnosis models, wherein the plurality of anomaly diagnosis models are retrieved from the database; determine the state of operation of the CCGT plant using plurality of state determination models wherein the state can be steady or unsteady state; predict a plurality of key performance parameters of CCGT plant using a plurality of predictive models and the integrated data, wherein the plurality of predictive models are retrieved from the database; configure an optimizer using the plurality of predictive models to optimize the plurality of key performance parameters of the CCGT plant; generate a second set of manipulated variables using the configured optimizer; determine an optimal set of manipulated variables using the first set of manipulated variables and the second set of manipulated variables based on the cause of the detected anomalies, the determined state of the CCGT plant, and importance of the plurality of key performance parameters of the CCGT plant, wherein the importance is either defined by a user or obtained from the database; calculate rating points for each of the plurality of key performance parameters using determined importance for each of the performance parameters, for both the first set and the second set of manipulated variables; compute a reward value utilizing rating points calculated for first set and second set of manipulated variables; and recommend the optimal set of manipulated variables using a predefined set of conditions involving the comparison of the reward value with an upper threshold value and a lower threshold value.

In another aspect, a method for optimizing the operation of a combined cycle gas turbine (CCGT) plant is provided. Initially, a plurality of data from a one or more databases of the CCGT plant is received at a predetermined frequency, wherein the plurality of data comprises of a real-time and a non-real-time data. The received plurality of data is then preprocessed. Further, a set of soft sensor parameters is estimated using a plurality of soft sensors. The set of soft sensor parameters are then integrated with the pre-processed plurality of data, wherein the integrated data comprises of first set of manipulated variables. At the next step, process and equipment anomalies related to the CCGT plant and individual units of the CCGT plant are detected, using a plurality of anomaly detection models, wherein the plurality of anomaly detection models are retrieved from the database. Further, at least one cause of the detected anomalies is identified using the plurality of anomaly diagnosis models, wherein the plurality of anomaly diagnosis models are retrieved from the database. Further, the state of operation of the CCGT plant is identified using plurality of state determination models wherein the state can be steady or unsteady state. In the next step, a plurality of key performance parameters of CCGT plant is predicted using a plurality of predictive models and the integrated data, wherein the plurality of predictive models are retrieved from the database. An optimizer is then configured using the plurality of predictive models to optimize the plurality of key performance parameters of the CCGT plant. Further, a second set of manipulated variables is generated using the configured optimizer. An optimal set of manipulated variables are then determined using the first set of manipulated variables and the second set of manipulated variables based on the cause of the detected anomalies, the determined state of the CCGT plant, and importance of the plurality of key performance parameters of the CCGT plant, wherein the importance is either defined by a user or obtained from the database. At the next step, rating points are calculated for each of the plurality of key performance parameters using determined importance for each of the performance parameters, for both the first set and the second set of manipulated variables. Further, a reward value is calculated utilizing rating points calculated for first set and second set of manipulated variables. And finally, optimal set of manipulated variables is recommended using a predefined set of conditions involving the comparison of the reward value with an upper threshold value and a lower threshold value.

In yet another aspect, one or more non-transitory machine readable information storage mediums comprising one or more instructions which when executed by one or more hardware processors cause optimizing the operation of a combined cycle gas turbine (CCGT) plant is provided. Initially, a plurality of data from a one or more databases of the CCGT plant is received at a predetermined frequency, wherein the plurality of data comprises of a real time and a non-real time data. The received plurality of data is then preprocessed. Further, a set of soft sensor parameters is estimated using a plurality of soft sensors. The set of soft sensor parameters are then integrated with the pre-processed plurality of data, wherein the integrated data comprises of first set of manipulated variables. At next step process and equipment anomalies related to the CCGT plant and individual units of the CCGT plant are detected, using a plurality of anomaly detection models, wherein the plurality of anomaly detection models are retrieved from the database. Further, at least one cause of the detected anomalies is identified using the plurality of anomaly diagnosis models, wherein the plurality of anomaly diagnosis models are retrieved from the database. Further, the state of operation of the CCGT plant is identified using plurality of state determination models wherein the state can be steady or unsteady state. In the next step, a plurality of key performance parameters of CCGT plant is predicted using a plurality of predictive models and the integrated data, wherein the plurality of predictive models are retrieved from the database. An optimizer is then configured using the plurality of predictive models to optimize the plurality of key performance parameters of the CCGT plant. Further, a second set of manipulated variables is generated using the configured optimizer. An optimal set of manipulated variables are then determined using the first set of manipulated variables and the second set of manipulated variables based on the cause of the detected anomalies, the determined state of the CCGT plant, and importance of the plurality of key performance parameters of the CCGT plant, wherein the importance is either defined by a user or obtained from the database. At the next step rating points are calculated for each of the plurality of key performance parameters using determined importance for each of the performance parameters, for both the first set and the second set of manipulated variables. Further, a reward value is calculated utilizing rating points calculated for first set and second set of manipulated variables. And finally, optimal set of manipulated variables is recommended using a predefined set of conditions involving the comparison of the reward value with an upper threshold value and a lower threshold value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
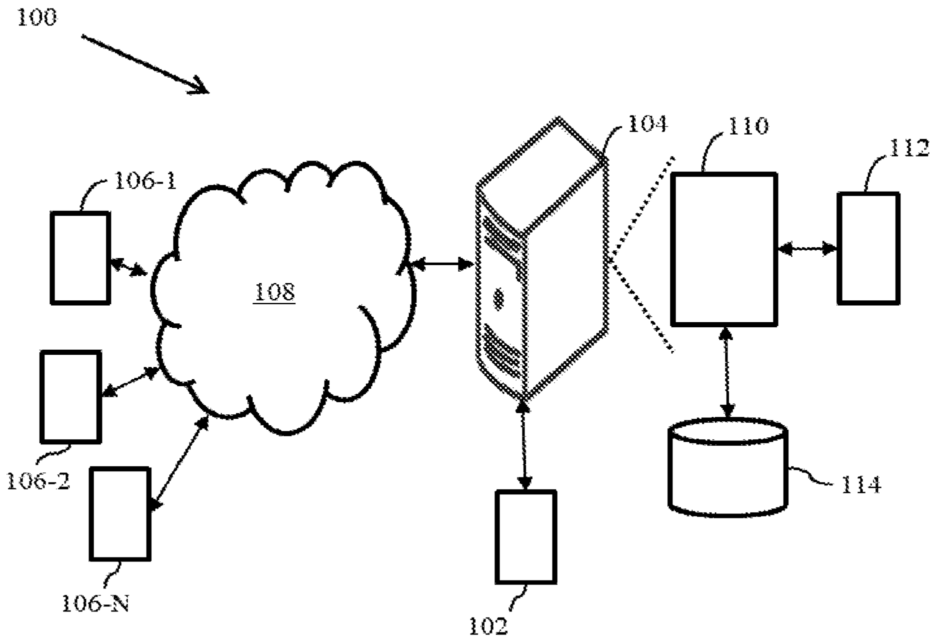
FIG. 1 is an architectural view of a system for optimizing the operation of a combined cycle gas turbine plant according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 13B, where similar reference characters denote corresponding features consistently throughout the figures, there are shown preferred embodiments and these embodiments are described in the context of the following exemplary system and/or method.

According to an embodiment of the disclosure, a system 100 for optimizing the operation of a combined cycle gas turbine (CCGT) plant 102 is shown in the block diagram of FIG. 1. The system 100 is configured to calculate an optimal value of manipulated variables (MV) with efficiency as one of the key performance parameters. The manipulated variables from the existing CCGT automation system, i.e. a first set of manipulated variables and the manipulated variables from the optimization approach, i.e. a second set of manipulated variables are combined to determine an optimal set of manipulated variables.

It may be understood that the system 100 may comprises one or more computing devices 104, such as a laptop computer, a desktop computer, a notebook, a workstation, a cloud-based computing environment and the like. It will be understood that the system 100 may be accessed through one or more input/output interfaces 106-1, 106-2 . . . 106-N, collectively referred to as I/O interface 106. Examples of the I/O interface 106 may include, but are not limited to, a user interface, a portable computer, a personal digital assistant, a handheld device, a smartphone, a tablet computer, a workstation and the like. The I/O interface 106 are communicatively coupled to the system 100 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 100 through communication links.

In an embodiment, the computing device 104 further comprises one or more hardware processors 110, hereinafter referred as a processor 110, one or more memory 112, hereinafter referred as a memory 112 and a data repository 114 or a database 114, for example, a repository 114. The memory 112 is in communication with the one or more hardware processors 110, wherein the one or more hardware processors 110 are configured to execute programmed instructions stored in the memory 112, to perform various functions as explained in the later part of the disclosure. The repository 114 may store data processed, received, and generated by the system 100.

The system 110 supports various connectivity options such as BLUETOOTH®, USB, ZigBee and other cellular services. The network environment enables connection of various components of the system 110 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 110 are described further in detail.

Figure 2:
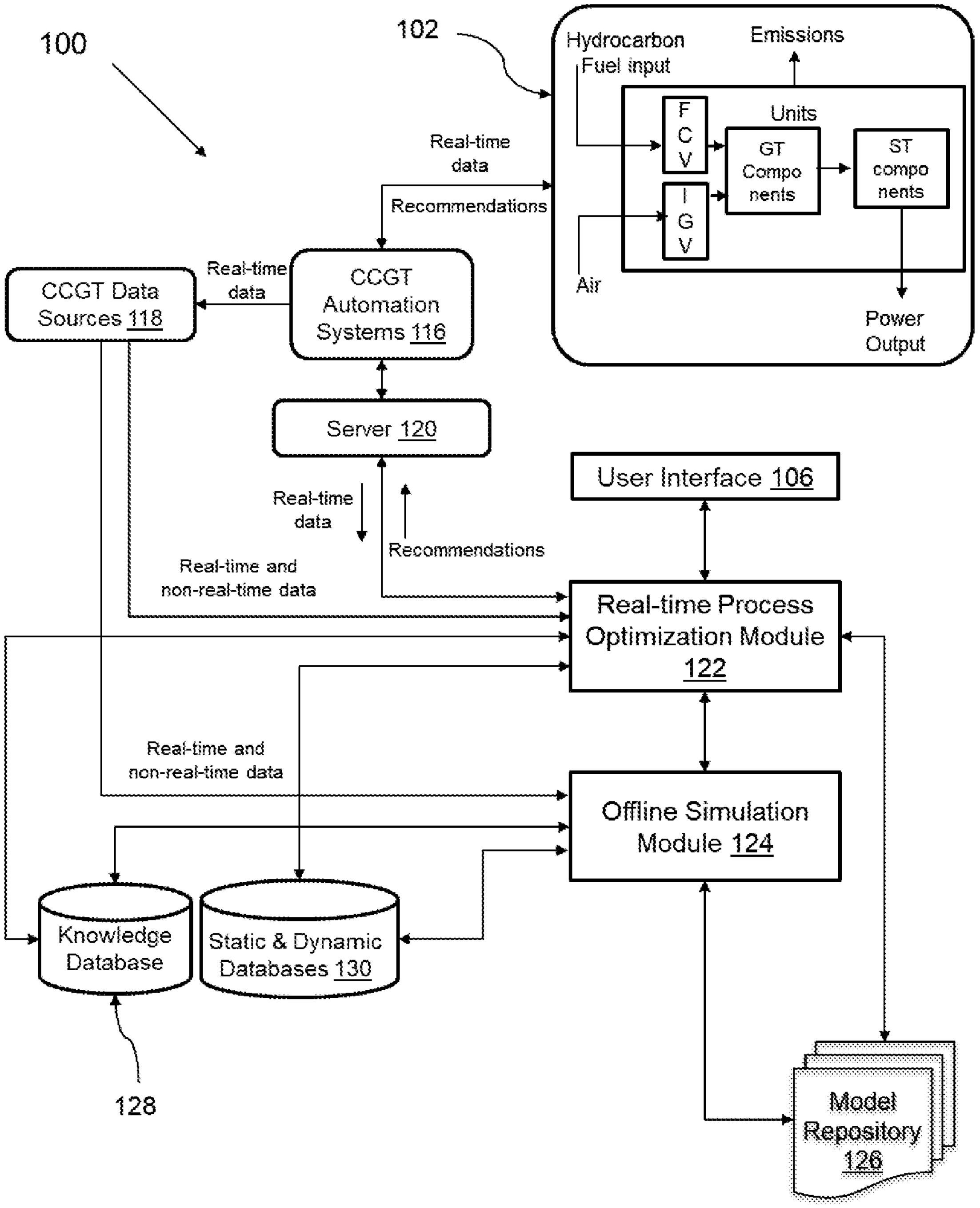
FIG. 2 is a functional block diagram of the system described in FIG. 1 for real-time optimization of the operation of the combined cycle gas turbine plant according to some embodiments of the present disclosure.

According to an embodiment of the disclosure, a system 100 for optimizing the operation of a combined cycle gas turbine (CCGT) 102 is shown in the block diagram of FIG. 2. The system (100) comprises of a real-time fuel quality measurement sensors (not shown in figure), CCGT automation system or distributed control system (DCS) 116, CCGT data sources 118, a server 120, a real-time process optimization module 122, an offline simulation module 124, a model repository 126, a knowledge database 128 and static and dynamic databases 130. It should be appreciated that the model repository 126, the knowledge database 128 and static and dynamic databases 130 could be the part of the data repository 114.

Figure 3:
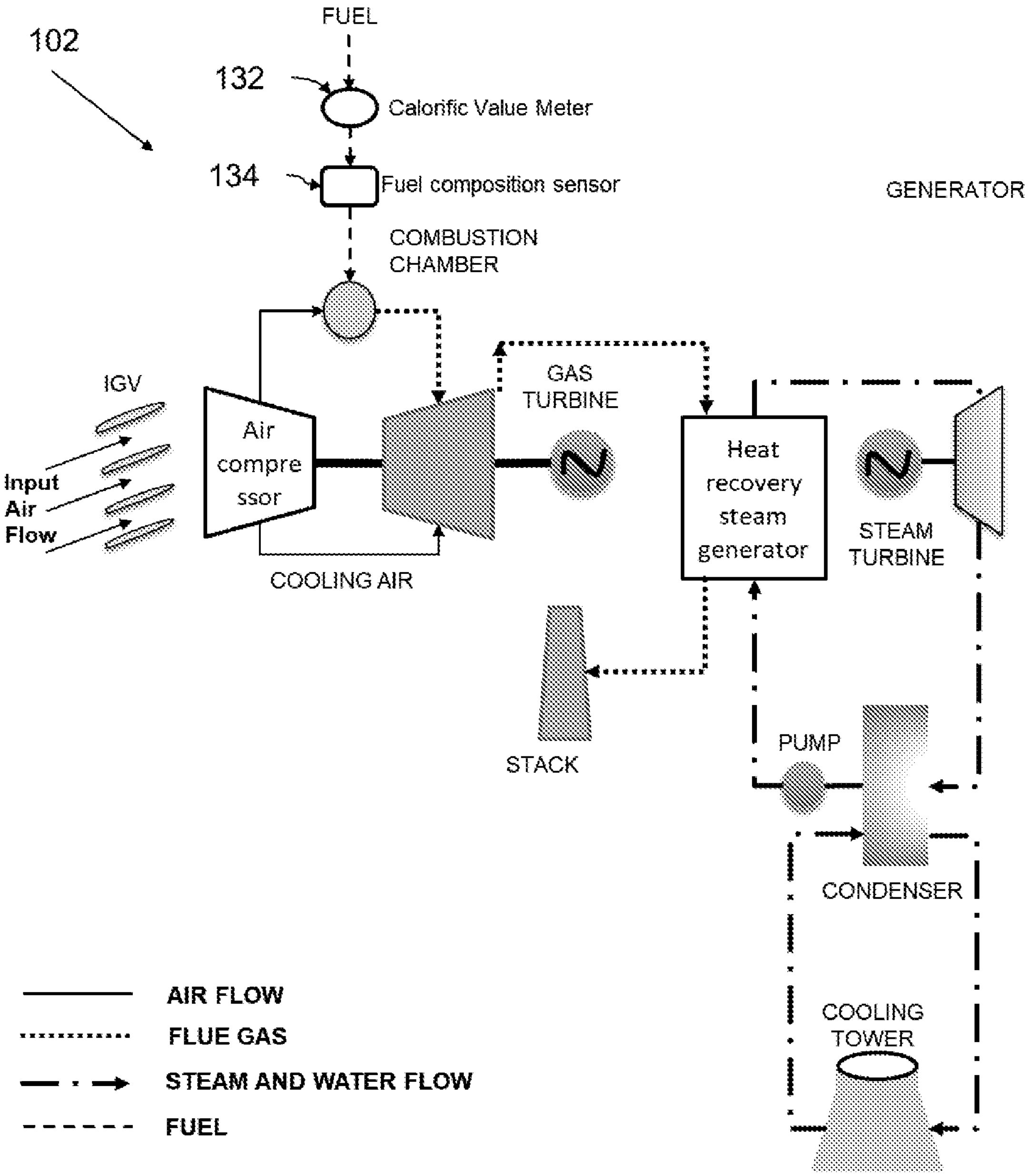
FIG. 3 is a schematic representation of the combined cycle gas turbine plant according to some embodiment of the present disclosure.

According to an embodiment of the present disclosure, the working of the combined cycle gas turbine plant 102 is depicted in the block diagram of FIG. 3. The combined cycle gas turbine plant 102 comprises of a gas turbine which is coupled with a steam turbine unit. The CCGT plant can constitute of a plurality of gas turbines and steam turbines, but at least one of each of them should be present in a single CCGT unit. Air and hydrocarbon fuel (gaseous fuel such as natural gas or liquid fuel such as diesel) are the inputs to the gas turbine. Atmospheric air is drawn through the primary and secondary air filters into a large air inlet section where it is humidified (if required) and finally enters the compressor through the inlet guide vanes. The pressure and temperature of air increase as it passes through the compressor. The heated air is mixed and burnt with pre-heated hydrocarbon fuel in the combustion chamber to generate flue gas at temperatures between 1200 and 1600° C. Flue gas at high temperature and pressure expands as it moves through the turbine section and rotates a series of turbine blades attached to a shaft and a generator thereby generating electricity. Some part of the preheated air from the compressor is taken out and used for cooling the turbine blades during operation.

Exhaust gas from the gas turbine exits at temperatures between 550 and 650° C. and is passed through a heat recovery steam generator (HRSG) to generate live steam with temperatures between 420 and 580° C. In the HRSG, highly purified water flows in tubes whereas the hot gases flow around the tubes producing steam inside the tubes. Steam can exit the HRSG at different pressures and is used to run a series of steam turbines configured for high, medium and low pressures leading to generation of more electricity. The gas turbine and steam turbine may be mounted on the same shaft or on different shafts.

Some portion of generated steam is used for preheating the fuel to the gas turbine as well as for cooling the combustors in the gas turbine. The hot gases leave the HRSG at 140° C. and are discharged into the atmosphere through the stack after appropriate gas treatment. Low pressure steam exiting the steam turbine is condensed using cooling water from water bodies (lake, river or ocean) in a condenser. The condensate is used as feed water to the HRSG keeping it in continuous circulation. The hot water from the condenser is then cooled in large cooling towers. The combined operation of gas and steam turbines in combined cycle power plants increases the overall efficiency to greater than 50%. The key performance parameters of a combined cycle gas turbine plant include generated power, overall thermal efficiency, electric power frequency, gas turbine exhaust gas temperature, pollutants such as nitrogen oxides (NOx) and sulphur oxides (SOx) in exit gas and overall cost of operation. The performance of the plant can be modulated by varying manipulated variables (MVs) such as flow rate of fuel (by varying the percentage opening of fuel control valves), flow rate of inlet atmospheric air (by varying the opening of inlet guide vanes), turbine cooling water flow rate, proportion of mixing of various fuels and steam flow rates used for cooling and heating (varied using steam control valves). Thus, the manipulated variables comprises of, but not limited to percentage of opening of one or more fuel control valves, opening of inlet guide vane (IGV), turbine cooling flow rate, proportion of mixing of different fuels and percentage opening of steam control valves.

According to an embodiment of the present disclosure, a fuel calorific meter 132 and a fuel composition sensor 134 are added to the physical system at the inlet of the fuel control valve as shown in FIG. 3. Usually the composition of fuel changes owing to mixing of different grades of fuel at the inlet. Fuel calorific value can vary quite a lot and hence knowing calorific value along with real time composition is important for optimal usage of fuel. This can have significant impact while determining optimal values of manipulated variables. Sensors 132 and 134 hence can help and are installed at the inlet of fuel control valves. Real time values of fuel calorific value and its composition are fed to the server 120 which further directs themx to real-time process optimization module 122 as shown in FIG. 2.

In the preferred embodiment, the control system or CCGT automation system 116 operates the CCGT in a prescribed manner such that the plant meets the required load demand from the grid while keeping operations safe and optimal in terms of overall fuel consumed and having emissions within prescribed limits. It generates manipulated variables which serves as inputs to the CCGT actuators, thereby driving them in real-time. The CCGT automation system 116 interacts with various respective CCGT data sources 118 which comprises of laboratory information management system (LIMS), Historian, manufacturing execution system (MES) and saves the real time data within these data sources. THE CCGT Automation system (104) also interacts with a real-time process optimization module 122 through the server 120 such as an OPC server. The real-time process optimization module 122 receives real-time data from the CCGT automation system 116 via the server 120, the real-time and non-real-time data from CCGT data sources 118, and other relevant information from static and dynamic databases 120 and knowledge database 128. These databases hold the information processed by real-time process optimization module 122 and offline simulation module 124. The real-time process optimization module 122 comprises of several modules that pre-process the received data, obtains simulated data using the pre-processed data and soft sensors, combine simulated data and pre-processed data to obtain integrated data, and uses the integrated data to provide services such as anomaly detection and diagnosis, steady state determination, and process optimization using the knowledge database, static and dynamic databases 130 and the model repository 126. The model repository 126 stores physics-based and data-driven models for various CCGT performance parameters and other key variables of interest. The models are tuned or created using historical operations as well as laboratory data.

According to an embodiment of the disclosure, referring to FIG. 2, wherein the static databases of the static and dynamic databases 130 comprise of data and information that do not vary with time such as materials database that consists of static properties of raw materials, byproducts and end-products, emissions, etc., an equipment database that consists of equipment design data, details of construction materials, etc., and a process configuration database that consists of process flowsheets, equipment layout, control and instrumentation diagrams, etc. Also, Static database constitute of an algorithm database consisting of algorithms and techniques of data-driven, physics-based and hybrid models, and solvers for physics-based models, hybrid models and optimization problems.

Further, the dynamic databases of static and dynamic databases 130 comprise of data and information that is dynamic in nature and are updated either periodically or after every adaptive learning cycle. Dynamic databases comprise of an operations database that consists of process variables, sensor data, a laboratory database that consists of properties of raw materials, byproducts and end-products obtained via tests at the laboratories, a maintenance database that consists of condition of the process, health of the equipment, maintenance records indicating corrective or remedial actions on various equipment, etc., an environment database that consists of weather and climate data such as ambient temperature, atmospheric pressure, humidity, dust level, etc.

According to an embodiment of the disclosure, referring to FIG. 2, the knowledge database 128 constitute the knowledge derived while running real-time process optimization module 122 and is potentially a useful information to be used at any later stage of operation. This also includes the key performance curves derived from historical data using multitude of offline simulation using offline simulation module 124, which are used by a recommendation module 320. Knowledge database also includes information related to the performance of various algorithms stored in the static database, This information can assist in recommending suitable algorithm based on their previous performance.

Further, an offline simulation module 124 performs simulation tasks on the CCGT plant that are not required or not possible in real-time owing to the complexity of the system but are useful to be performed at a regular intervals. The offline simulation module 124 generates specific test instances for simulation that are simulated using high fidelity physics-based models and data-driven models. These modules provides insights into overall operation of the CCGT plant 102. The offline simulation module 124 interacts with static and dynamic databases 130, the knowledge database 128 and the model repository 126 to perform certain simulations. It also interacts with the real-time process optimization module 122 to receive information and simulation requests, and return the simulation results and insights based on offline simulations to the optimization module.

The outputs of various modules are shown to the user via the user interface 106. The recommendations from the real-time process optimization system include optimal settings of MVs such as percentage opening of fuel control valves, percentage opening or angle of inlet guide vanes, turbine cooling water flow rate, proportion of mixing of various fuels and percentage opening of steam control valves in order to improve the key performance parameters of CCGT.

Figure 4:
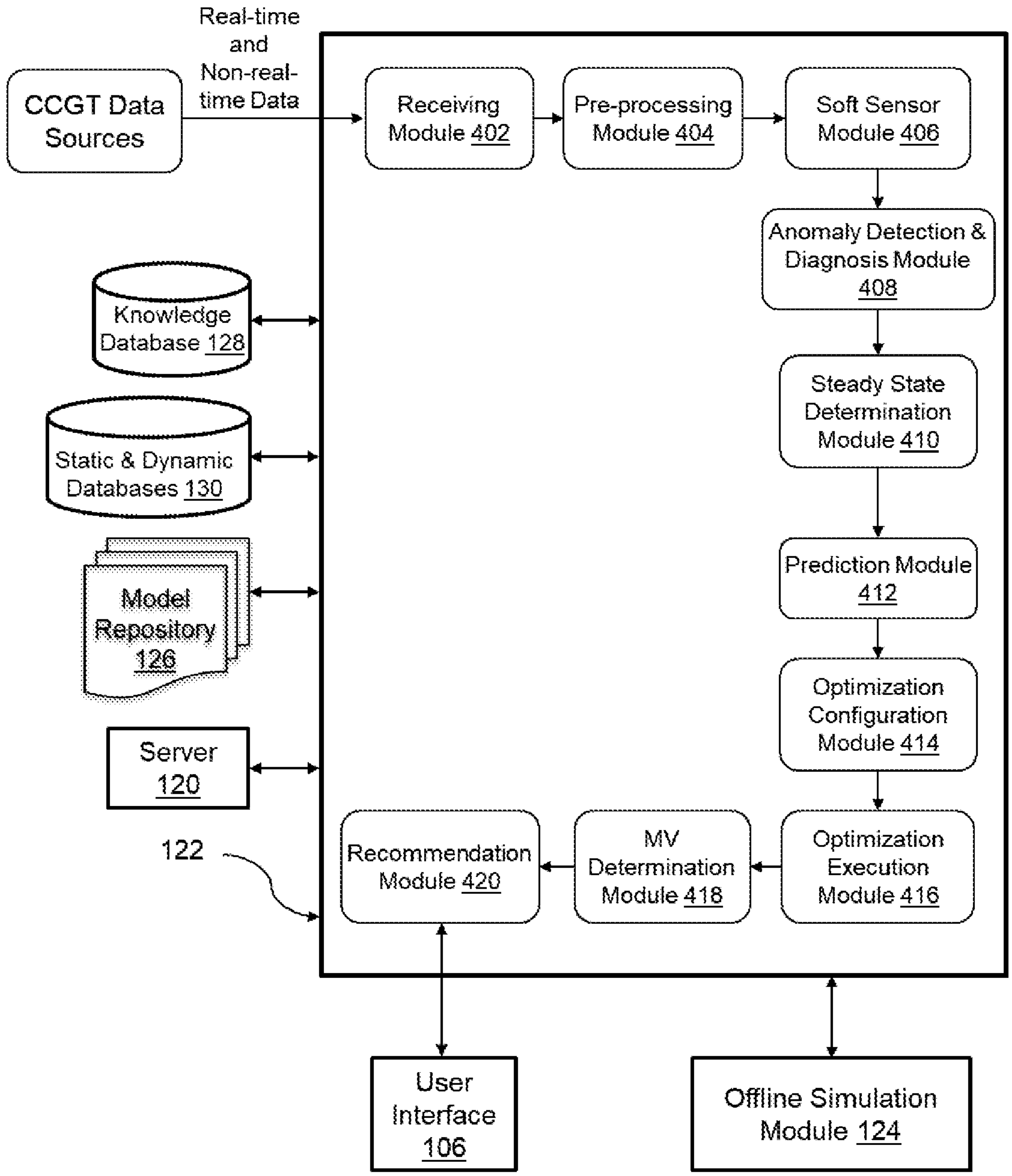
FIG. 4 is a block diagram of the real-time process optimization module in accordance with some embodiments of the present disclosure.

According to an embodiment of the disclosure, a functional block diagram to illustrate a workflow of the real-time process optimization module 122 is shown in FIG. 4. The real-time process optimization module 122 comprises of a receiving module 402, a pre-processing module 404, a soft sensor module 406, an anomaly detection and diagnosis module 408, a steady state determination module 410, a prediction module 412, an optimization configuration module 414, an optimization execution module 416, a manipulated variable determination module 418 and a recommendation module 420.

According to an embodiment of the disclosure, the receiving module 402 is configured to receive real-time from the server 120 and non-real-time data from the CCGT data sources 118 at a pre-determined frequency. As the CCGT plant 102 is a dynamic system, data may be configured to be received at a frequency of once in 3 seconds, 5 seconds, 10 seconds or 1 min. Real-time data comprises of operations data such as temperature, pressure, flow rate, level, valve opening percentages and vibrations measured in different sub-units such as the compressor, combustors, fuel heater, gas turbine, turbine cooler, HRSG, steam turbine, condenser, generator and exit gas system. It also comprises of environment data such as ambient temperature, atmospheric pressure, ambient humidity, rainfall, etc. Real-time data is obtained from plant automation systems such as distributed control system (DCS) via a communication server such as OPC server or via an operations data source such as a historian. The non-real-time includes data from laboratory tests and maintenance activities. Laboratory data consists of chemical composition, density and calorific value of the fuel used in the gas turbine while maintenance data includes details of planned and unplanned maintenance activities performed on one or more units of the plant, and condition and health of the process and various equipment in the plant. The non-real-time data is obtained from LIMS, MES, historian and other plant maintenance databases. In a typical CCGT plant, the total number of variables from various data sources can be between 200 and 500 variables.

According to an embodiment of the disclosure, the pre-processing module 404 is configured to perform pre-processing of the real-time and non-real-time data received from multiple data sources of the combined cycle power plant. Pre-processing involves removal of redundant data, unification of sampling frequency, outlier identification & removal, imputation of missing data, synchronization and integration of variables from multiple data sources. The sampling frequency of real-time and non-real-time data may be unified to, for example, once every 1 min, where the real-time data is averaged as necessary and the non-real-time data is interpolated or replicated as necessary.

According to an embodiment of the disclosure, the soft-sensor module 406 is configured to obtain simulated data or soft-sensed data using pre-processed data and physics-based or data-driven soft sensors. In an example, the soft sensor module is also referred as the plurality of soft sensors. Soft sensors are parameters that influence the key performance parameters of the plant but cannot be measured using physical sensors. In case of the CCGT plant, key soft sensors include power generated by gas turbine, power generated by steam turbine, relative humidity of inlet air after humidification, turbine inlet temperature (T1T), and flow rate and temperature of turbine cooling air. Values of these soft sensors are estimated using heat and mass balance (or enthalpy balance) calculations or using high fidelity one-dimensional or two-dimensional modeling of the units in the combined cycle power plant. Soft sensors such as T1T can also be estimated using data-driven soft sensors involving gas turbine exhaust gas temperature wherein the relationship between the two may be obtained from plant scale experiments or provided by the original equipment manufacturer (OEM). Soft sensor estimation can be performed in the real-time process optimization module 122 if the soft sensor calculations are not computationally intensive or time consuming. If the soft sensors include high-fidelity physics-based models, the soft sensor estimation is requested from the offline simulation module 124. The soft-sensed parameters are integrated with the pre-processed data to obtain integrated data of the CCGT plant 102.

Figure 6:
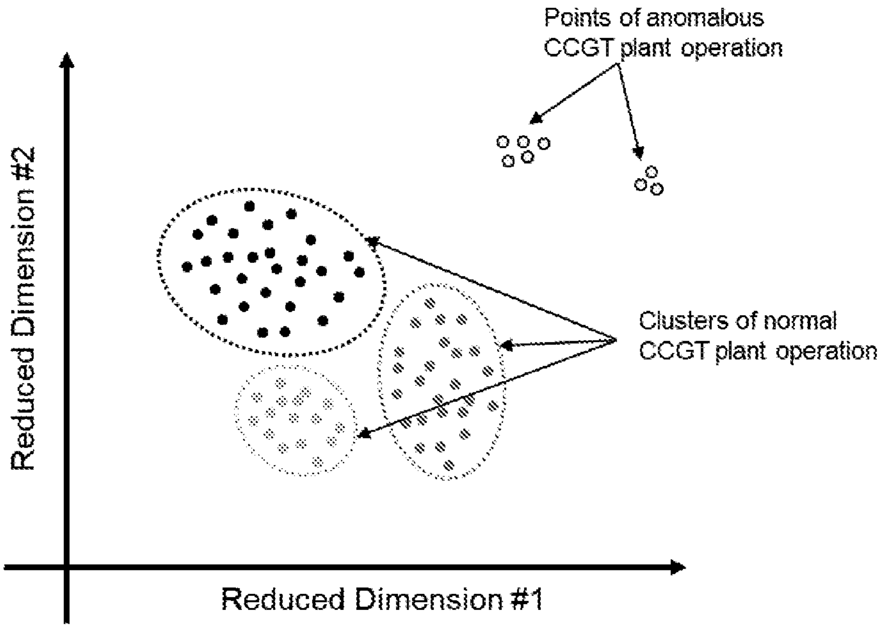
FIG. 6 depicts process anomalies in the combined cycle gas turbine plant in two dimensions according to an embodiment of the present disclosure.

According to an embodiment of the disclosure, the anomaly detection and diagnosis module 408 is configured to detect process and equipment anomalies (or faults), localize the anomaly and identify the root cause of the anomaly in real-time. Different units of the CCGT plant have different dynamics. For example, the gas turbine is a highly dynamic unit where changes in load, fuel flow rate, air flow rate, etc. can happen on the order of seconds or minutes whereas the HRSG and steam turbine have slower dynamics where steam flow rates and temperatures take 30-40 min to change when there is a change in the power demand. Due to unequal and complex process dynamics, the CCGT plant 102 is prone to anomalous operation wherein the KPIs and other key variables drift from their expected behavior and may lead to an unplanned shutdown. FIG. 6 depicts process anomalies in the combined cycle gas turbine plant 102 in two dimensions (derived from the high dimensional space of all variables in CCGT using a dimensionality reduction technique such as principal component analysis or encoder-decoder). The anomalous points are far from the clusters of normal operation wherein the clusters could be due to differences in ambient temperature, load of operation, condition of the equipment, etc.

Figure 7:
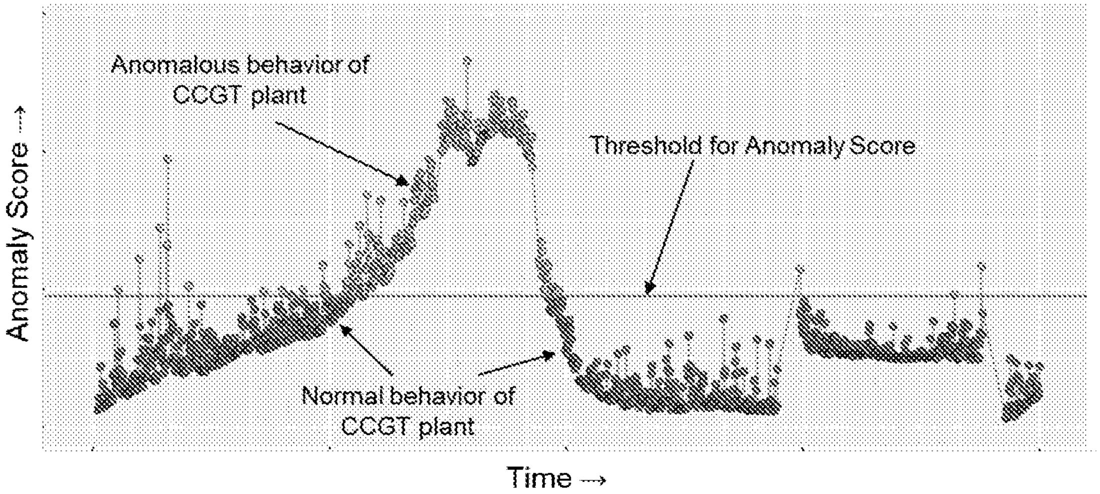
FIG. 7 illustrates the identification of anomalous behavior during the operation of a CCGT plant wherein the anomaly score is higher than the pre-defined threshold according to an embodiment of the present disclosure.

The anomaly detection and diagnosis module 408 computes anomaly scores summarizing the operation of the entire plant as well as individual units in the CCGT plant 102 in real-time using a plurality of anomaly detection models and a subset of all variables in the plant. Herein, anomaly detection models can be available for all units in the CCGT plant 102 including gas turbine, steam turbine, HRSG, generator, condenser and fuel combustors. The anomaly scores will have at least one threshold. For every time instance, the anomaly score is compared against its threshold. If the anomaly score is above the threshold for one or more instances, anomaly diagnosis is carried out. FIG. 7 illustrates the identification of anomalous behavior during operation of CCGT plant wherein the anomaly score is higher than the threshold. The behavior of other key variables during the same time period is also shown in the figure. Anomaly diagnosis is carried out to identify the unit and sub-unit as well as the probable root cause of the detected anomalies. It should be appreciated that in case the CCGT plant is exhibiting anomalous behavior, the user is notified of the location, severity, and probable root cause of the anomalies, and the subsequent step of steady state determination is not carried out.

It should be appreciated that anomaly detection and diagnosis models are data-driven models trained using historical data of the CCGT plant and built using statistical, machine learning and deep learning techniques such as principal component analysis, Mahalanobis distance, isolation forest, random forest classifiers, one-class support vector machine, artificial neural networks and its variants, elliptic envelope and auto-encoders (e.g. dense auto-encoders, LSTM auto-encoders) and Bayesian networks. The data-driven models can be point models (that do not consider temporal relationship among data instances) or time series models (that consider temporal relationship among data instances).

According to an embodiment of the disclosure, the steady state determination module 410 is configured to classify the state of operation of the CCGT plant 102 into steady and unsteady states in real-time using a subset of plant variables comprising of, but not limited to, total generated power, frequency of power generated (or rotational speed of shaft), fuel flow rate and inlet air flow rate using a plurality of state determination models. Steady state is defined as the state of operation when the variation in power generated by the plant is within permissible limits along with small variations in other key CCGT variables such as rotational speed, fuel flow rate and air flow rate. Unsteady state is defined as the state of operation wherein the variation in power generated by the plant and other CCGT variables is beyond the steady state limits.

Figure 8:
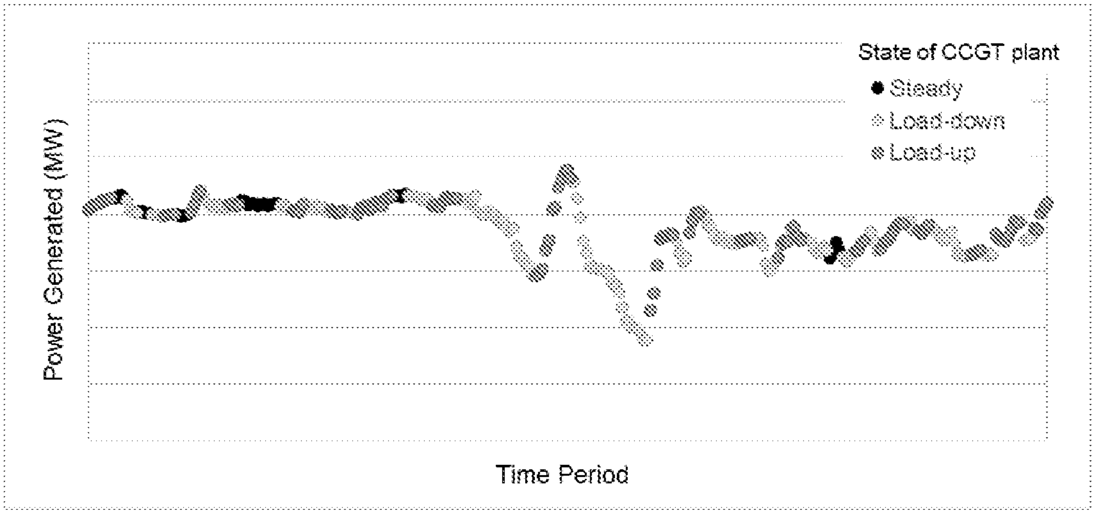
FIG. 8 illustrates the classification of CCGT plant operation into steady, load-up and load-down states according to an embodiment of the present disclosure.

It should be appreciated that the state determination models are data-driven classifiers trained using historical data of the CCGT plant. The state determination models include classifiers that are rule-based as well as those built using machine learning and deep learning decision trees, random forest, support vector machine, artificial neural networks and its variants (e.g. multi-layer perceptron, LSTM classifier, etc.). The state determination models can be point models (that do not consider temporal relationship among data instances) or time series models (that consider temporal relationship among data instances). It is to be noted that the unsteady operation of CCGT plant is further classified into load-up (wherein the power generated by the plant is increasing with time), load-down (wherein the power generated by the plant is decreasing with time), start-up (wherein all units of the CCGT plant are being started as per sequence) and shutdown (wherein all units of the CCGT plant are being stopped as per sequence). FIG. 8 illustrates the classification of CCGT plant operation into steady, load-up and load-down states.

According to an embodiment of the present disclosure, the prediction module 412 is configured to predict a plurality of key performance parameters or plurality of performance indicators (KPIs) of the CCGT plant 102 in real-time using a plurality of prediction models and the integrated data. The key performance parameters of the CCGT plant 102 include thermal efficiency, generated power, frequency of power generated, exhaust gas temperature, cost of operation and pollutants in exit gas. It should be noted that the plurality of prediction models are trained using historical data of the CCGT plant. The plurality of models are data-driven models or hybrid models built using machine learning and deep learning techniques that include variants of regression (multiple linear regression, stepwise regression, forward regression, backward regression, partial least squares regression, principal component regression, Gaussian process regression, polynomial regression, etc.), decision tree and its variants (random forest, bagging, boosting, bootstrapping), support vector regression, k-nearest neighbors regression, spline fitting or its variants (e.g. multi adaptive regression splines), artificial neural networks and it variants (multi-layer perceptron, recurrent neural networks & its variants e.g. long short term memory networks, and convolutional neural networks) and time series regression models. The prediction models can be point models (that do not consider temporal relationship among data instances) or time series models (that consider temporal relationship among data instances).

According to an embodiment of the disclosure, the optimization configuration module 414 is configured to setup the optimization problem. It utilizes the plurality of predictive models from the model repository 126 and pre-defined system constraint to optimize plurality of KPI either by setting up an unconstrained, or a constrained optimization problem. Furthermore, the optimization configuration module 414 utilizes the steady state determination module 410, to define the kind of optimization problem to be performed. For example, in case of steady state operation, an optimizer is setup to perform single point optimization problem, while in case of unsteady operation, the optimizer is setup to perform trajectory optimization problem. Output of optimization configuration module will result in a cost function which is configured to be solved along with prescribed constraints on key performance parameters.

According to an embodiment of the disclosure, the optimization execution module 416 is configured to solve the cost function along with prescribed constraints as suggested by the optimization configuration module 414. Optimization execution module 416 utilizes plurality of optimization solvers based on specific problem comprising of iterative methods such as gradient descent, quasi Newton methods as well as heuristic optimization approaches comprising of Particle Swarm Optimization (PSO), genetic algorithms and bee colony optimization and generate the second set of manipulated variables as explained in the later part of the disclosure. Different units of CCGT plant 102 have different dynamics. Gas turbine is a highly dynamic unit where changes in load, fuel flow rate, air flow rate, etc. can happen in the order of seconds or minutes whereas the HRSG and steam turbine have slower dynamics where steam flow rates and temperatures take 30-40 min to change when there is a change in the power demand. Optimization execution module 314 takes care of this aspect of the problem by utilizing the concepts of time constrained optimization.

According to an embodiment of the disclosure, the MV determination module 418 is configured to utilize the second set of manipulated variables generated from the optimization module 416 and the first set of manipulated variables obtained from the distributed control system or CCGT automation system 116. The manipulated variable determination module 418 generates an optimal set of manipulated variables such that the GTCC plant 102 works in best possible zone in terms of required performance by assigning importance to the respective defined KPI and calculate the rating point for each KPI with respect to first and the second set of manipulated variables.

In the preferred embodiment, the recommendation module 420 is configured to recommend final value of MV which should be passed from the real time process optimization module 110 to the CCGT plant 102. The recommendation module 420 takes input rating point for each KPI with respect to the first and second set of manipulated variables from the MV determination module 418 to further calculate reward value for each of the KPI. A positive value of reward for any KPI states that second set of manipulated variable performs better, while a negative value of reward for any KPI states that first set of manipulated variable performs better. A final reward value is calculated by combining rewards from individual key performance parameters based on which final suggestion of manipulated variable is given out to CCGT plant 102.

Figure 5:
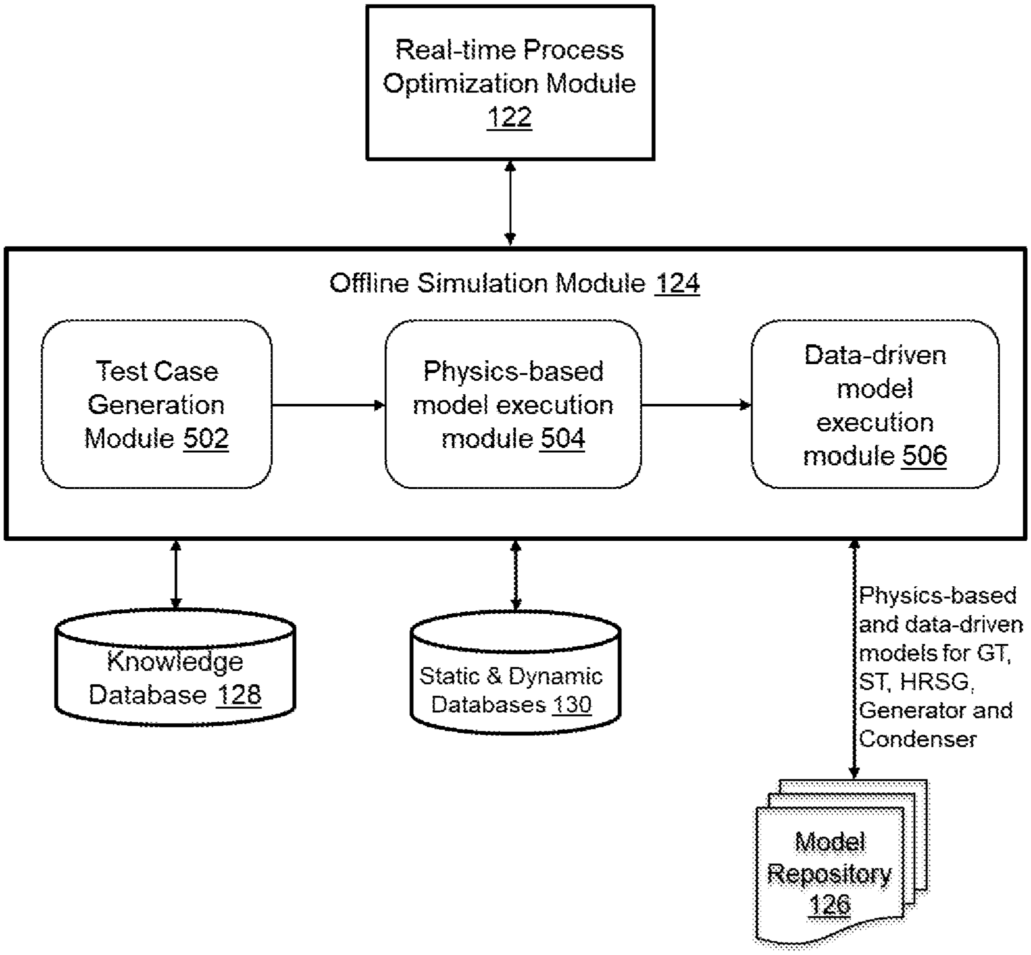
FIG. 5 is a block diagram of an offline simulation module according to an embodiment of the present disclosure.

According to an embodiment of the present disclosure, a functional block diagram to illustrate a workflow of the offline simulation module 112 is shown in FIG. 5. The offline simulation module 124 comprises of a test case generation module 502, a physics-based models execution module 504 and a data-driven models execution module 506. The offline simulation module 124 interacts with the knowledge database 128, static and dynamic databases 130 and the model repository 126. The offline simulation module 124 can be used to simulate one or more units as well as the entire CCGT plant 102. The request for offline simulation can come from the real-time process optimization module 122 and from the user via the user interface 106. Offline simulation utilizes physics-based models as well as data-driven models of the CCGT plant 102 that will be available in the model repository. According to an embodiment of the disclosure, the test case generation module 502 is configured to generate one or more test cases for offline simulation of one or more units or the entire CCGT plant. Inputs required for test case generation such as ranges and levels of variables to be varied during simulation, values of variables to be kept constant during simulation and the method of test case generation are taken either from the user or from the real-time process optimization module. The methods of test case generation include full factorial, Taguchi and manual design of experiments.

According to an embodiment of the disclosure, the physics-based models execution module 504 is configured to execute the physics-based models pertinent to one or more units or the entire CCGT plant on the test cases generated in the test case generation module. The module utilizes physics-based models and/or soft sensors that include one dimensional, two dimensional or three dimensional heat and mass balance (or enthalpy balance), force balance or thermodynamic models of one or more units in the CCGT plant 102 available in the model repository 126. Outputs from execution of physics-based models include temperature, velocity and pressure profiles across key units such as compressor, fuel combustor, gas turbine includes blades and exhaust gas duct, HRSG, steam turbine, condenser and cooling towers for each generated test case. Outputs from the physics-based models execution module 504 are displayed to the user via the user interface 106 and sent back to the real-time process optimization module 122.

According to an embodiment of the disclosure, the data-driven models execution module 506 is configured to execute the data-driven models pertinent to one or more units or the entire CCGT plant 102 on the test cases generated in the test case generation module 502 using the data-driven models from the model repository and some of the outputs from the physics-based model execution module. The module utilizes data-driven models and soft sensors developed for one or more units and KPIs of the CCGT plant. Outputs from the module include key performance parameters such as total power generated, compressor pressure ratio, turbine inlet temperature (T1T), blade path temperature, exhaust gas temperature, exit gas temperature and pollutants in exit gas. Outputs from this module are displayed to the user via the user interface and sent back to the real-time process optimization module.

According to an embodiment of the disclosure, optimization is performed with a pre-defined cost function. In case of the CCGT plant 102, with CCGT automation system or DCS is already working towards meeting demand, optimization framework is setup with CCGT economy of operation as the major KPI, while meeting target, reducing emissions as the system level constraints. Safety related constraints are also imposed within the optimization framework either in the form of a constrained optimization problem or as an additional layer of the optimization problem.

According to an embodiment of the disclosure, Key performance parameters or key performance indicators (KPI's) can be of two types, absolute and relative KPI's. Absolute KPI ($KPI_{abs}$) defines a tracking parameter, lesser the difference from an absolute tracked value, better is the system performance, for example tracking power or load demand or making system to operate as close to T1T control line as possible. Relative KPI ($KPI_{rei}$) has no fixed minimum or maximum value. Here, performance measurement is more relative in nature. Relative KPIs can have two type of aspects, first where KPI should be maximized and another where it should be minimized. For example, control of Nitrogen Oxides which is a pollutant (NoX), which termed as "as low as possible" or system overall efficiency, which is defined as "as high as possible".

Figure 9:
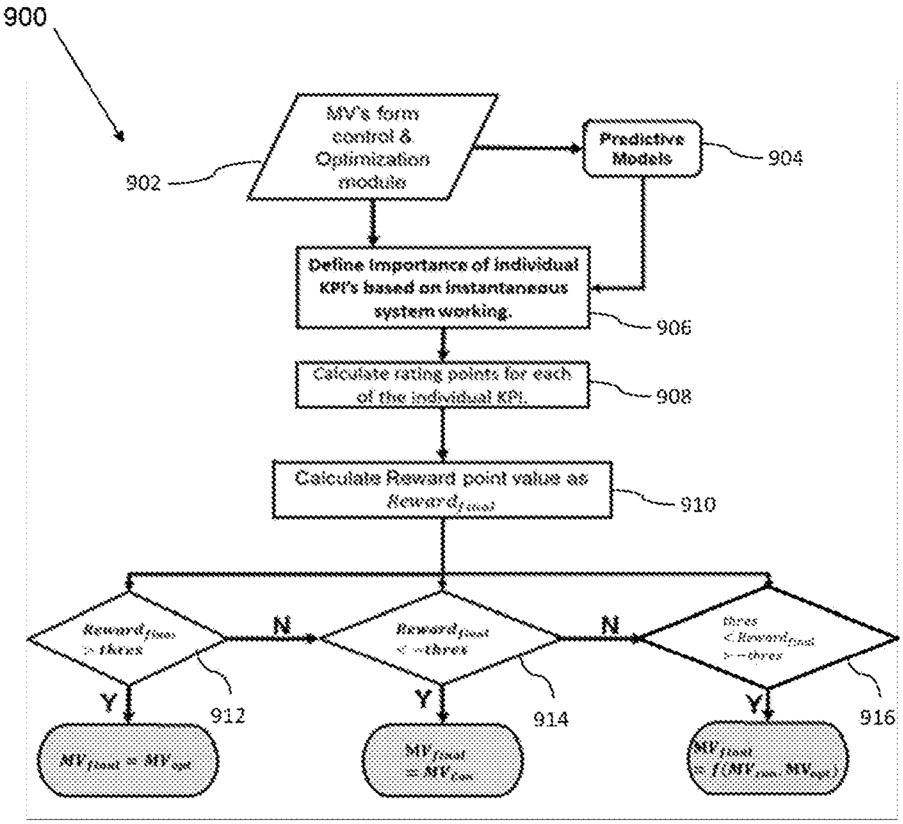
FIG. 9 is a flowchart showing a method for selecting the optimal set of manipulated variables in accordance with some embodiments of the present disclosure.

According to an embodiment of the disclosure, a methodology 900 for determining the optimal set of manipulated variables is shown in FIG. 9. The optimal set of manipulated variables can further be passed to the CCGT plant 102. Initially at step 902, the first set of manipulated variables obtained from the CCGT automation system (control system) 116 and the second set of manipulated variables obtained from the real time process optimization module 122 are obtained as inputs. At step 904, both sets of manipulated variables are passed to the plurality of predictive models to get the predictions of system level KPI's.

At step 906, importance of individual KPI's is defined based on the instantaneous plant conditions. For example, it is better to reduce NOx. But, if it is already within the statutory limits, it would be more prudent to optimize other KPis, say, load demand. To cover this aspect of KPI's, a KPI importance parameter is defined as $\beta$. So, higher the value of $\beta$ for any particular KPI, higher is its importance. This also brings in flexibility of plant operation, where MV's can be tuned against desired KPI.

At step 908, rating points $KPI_{points}$ are calculated for each of the individual KPIs. The rating points are calculated based on Tables 1-3 and the corresponding graphs shown in FIG. 11A through FIG. 11C. The $KPI_{points}$ are calculated by interpolation for each of the KPI for both the first set and the second set of manipulated variables. The calculation might appear different for each defined KPI type. For example, for $KPI_1$ which is an Absolute type KPI, shown in FIG. 11A, if $MV_{con}$ produces an error of 3$\gamma$ then we obtain $KPI_1$ points as 2.5$\beta_1$, while if error in meeting this KPI is 5$\gamma$ then we get $KPI_1$ points as 1.75$\beta_1$ by interpolation, based on the information in Table 1.

For $KPI_2$ which is a relative type KPI, a relative difference in value is calculated with respect to the control system and the optimization system suggested MV's. As defined in point (i) let maximum KPI change witnessed between two possible selected MV's is a in either direction, i.e. $KPI_{con}-KPI_{opt}<|\alpha_i|$. Based on the information in Tables 2 and 3, for a relative type KPI, shown in FIG. 11B and FIG. 11C, $MV_{con}$ and $MV_{opt}$ are such that $$KPI_{con} - KPI_{opt} = \frac{3\alpha_2}{4}.$$

Then, we get the equivalent point as $$\frac{-5\beta_2}{2}.$$

Similarly for other KPI, we get the equivalent point as $$\frac{5\beta_3}{2}.$$

TABLE 1

| $KPI_{abs}$ reward curve | |
|---|---|
| Target Error | Points |
| γ | $4\beta_1$ |
| 2γ | $3\beta_1$ |
| 4γ | $2\beta_1$ |
| 8γ | $\beta_1$ |

TABLE 2

| $KPI_{rel}$ reward curve | |
|---|---|
| $KPI_{con}$-$KPI_{opt}$ | Points |
| $-\alpha_2$ | $4\beta_2$ |
| $\frac{\alpha_2}{2}$ | $\beta_2$ |
| 0 | 0 |
| $\frac{\alpha_2}{2}$ | $-\beta_2$ |
| $\alpha_2$ | $-4\beta_2$ |

TABLE 3

| $KPI_{rel}$ reward curve | |
|---|---|
| $KPI_{con}$-$KPI_{opt}$ | Points |
| $-\alpha_3$ | $-4\beta_3$ |
| $\frac{\alpha_3}{2}$ | $-\beta_3$ |
| 0 | 0 |
| $\frac{\alpha_3}{2}$ | $\beta_3$ |
| $\alpha_3$ | $4\beta_3$ |

At step 910, a reward value ($Reward_{Final}$) is calculated utilizing the rating points calculated for first set and second set of manipulated variables. Thus, the reward variable is calculated simply by clubbing rewards from all KPI's as given below:

$$Reward_{Final} = \sum_j KPI^j_{reward}$$

Figure 10:
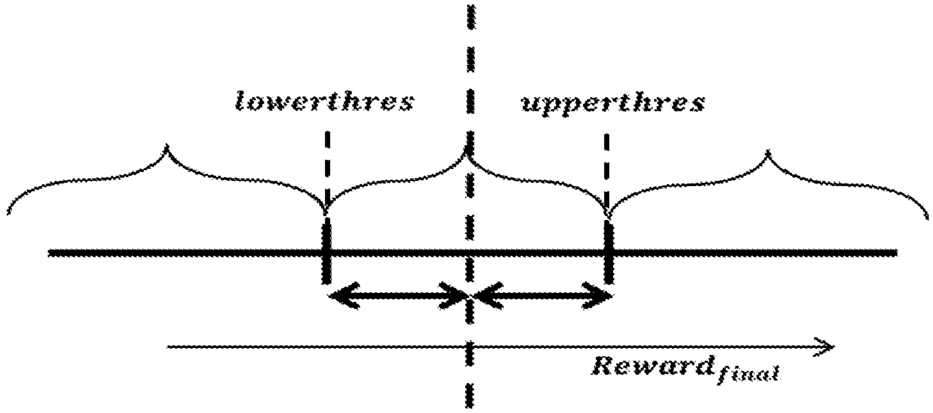
FIG. 10 is a graphical representation of maximum and minimum value of a final reward value according to some embodiments of the present disclosure.
Figure 11A:
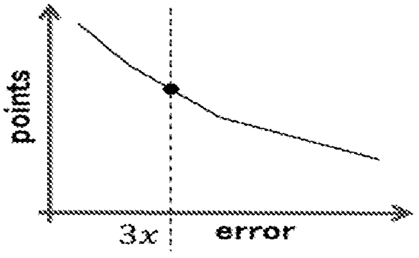
FIG. 11A to 11C provide a graphical representation of interpolation of error based on defined curve in case of relative KPI and absolute KPI according to an embodiment of the present disclosure.
Figure 11B:
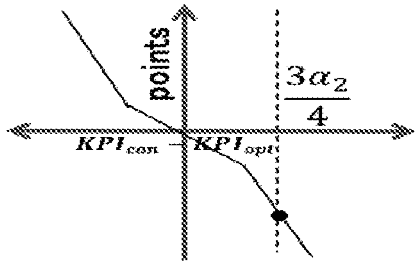
Figure 11C:
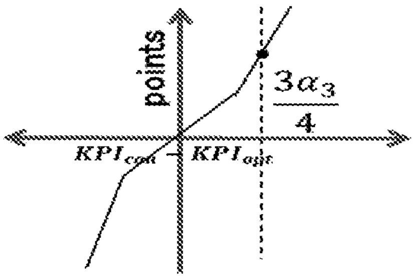

Finally at steps 912, 914 and 916, the final set of manipulated variables is decided based on a predefined set of conditions involving the final reward value. There are three possible regions for the selection of the manipulated set of variables depending on the predefined set of conditions. Two thresholds lowerthres and upperthres are defined, which refers to the zone where an interpolated value of MV needs to be passed based on $MV_{con}$ and $MV_{opt}$, as shown in FIG. 10.

Figure 12:
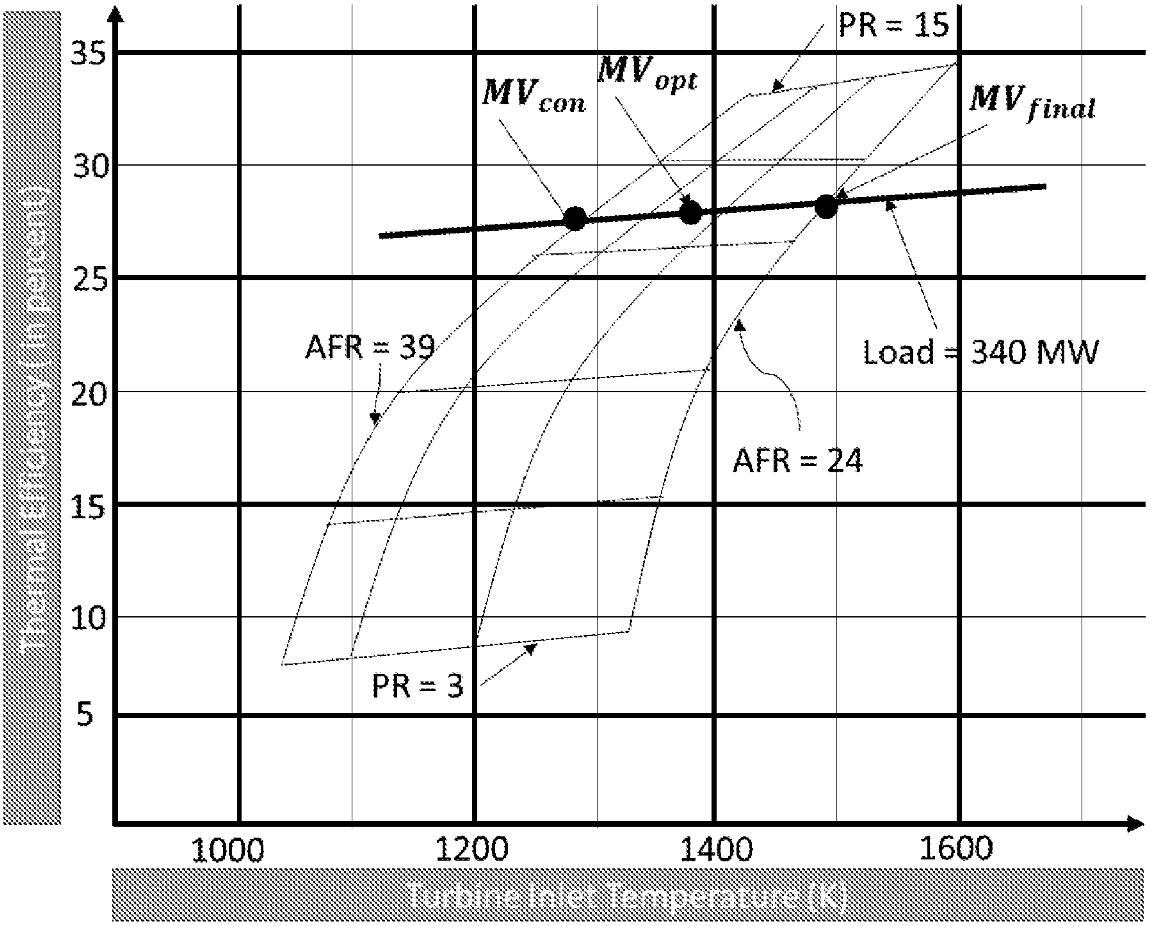
FIG. 12 shows an example of choosing the manipulating variable when the reward value is between the upper threshold value and the lower threshold value according to an embodiment of the present disclosure.

The predefined set of conditions comprises a) At step 314, if $Reward_{Final} < lowerthres$, it simply refers to worser KPI values when optimizer's MV's are selected, thus $MV_{final}=MV_{con}$ b) At step 316, if $Reward_{Final} > upperthres$, there is a high reward associated when manipulated variables are derived by optimizer, in this case, $MV_{final}=MV_{opt}$.

c) At step 318, if $lowerthres < Reward_{final} > upperthres$, then $MV_{final}=f(MV_{con}, MV_{opt})$ FIG. 12 shows an example of choosing the manipulating variable when the reward value is between the upper threshold value and the lower threshold value. A Compression ratio (PR) represents the required power output, and Air to Fuel ratio (AFR) indicates the amount of Air per unit of fuel. This figure shows the relationship between thermal efficiency and the turbine inlet temperature, which itself is a function of the amount of fuel per unit of air and hence serves as a manipulated variable for CCGT operation.

The relationship shown in FIG. 12 can be derived from historical data of CCGT operation as well and act as a function ($f(MV_{con}, MV_{opt})$) that can be used for deriving the optimum set of manipulated variables from the combined first and second set of manipulated variables.

With reference to the FIG. 12, for any given value of PR, power remain constant, thus solid line represents the isopower line representing specific load (and hence PR) based on which MV's are being suggested by controls and optimizer. $MV_{final}$ can lie on this isopower line and provides higher efficiency by commanding higher turbine inlet temperature.

Figure 13A:
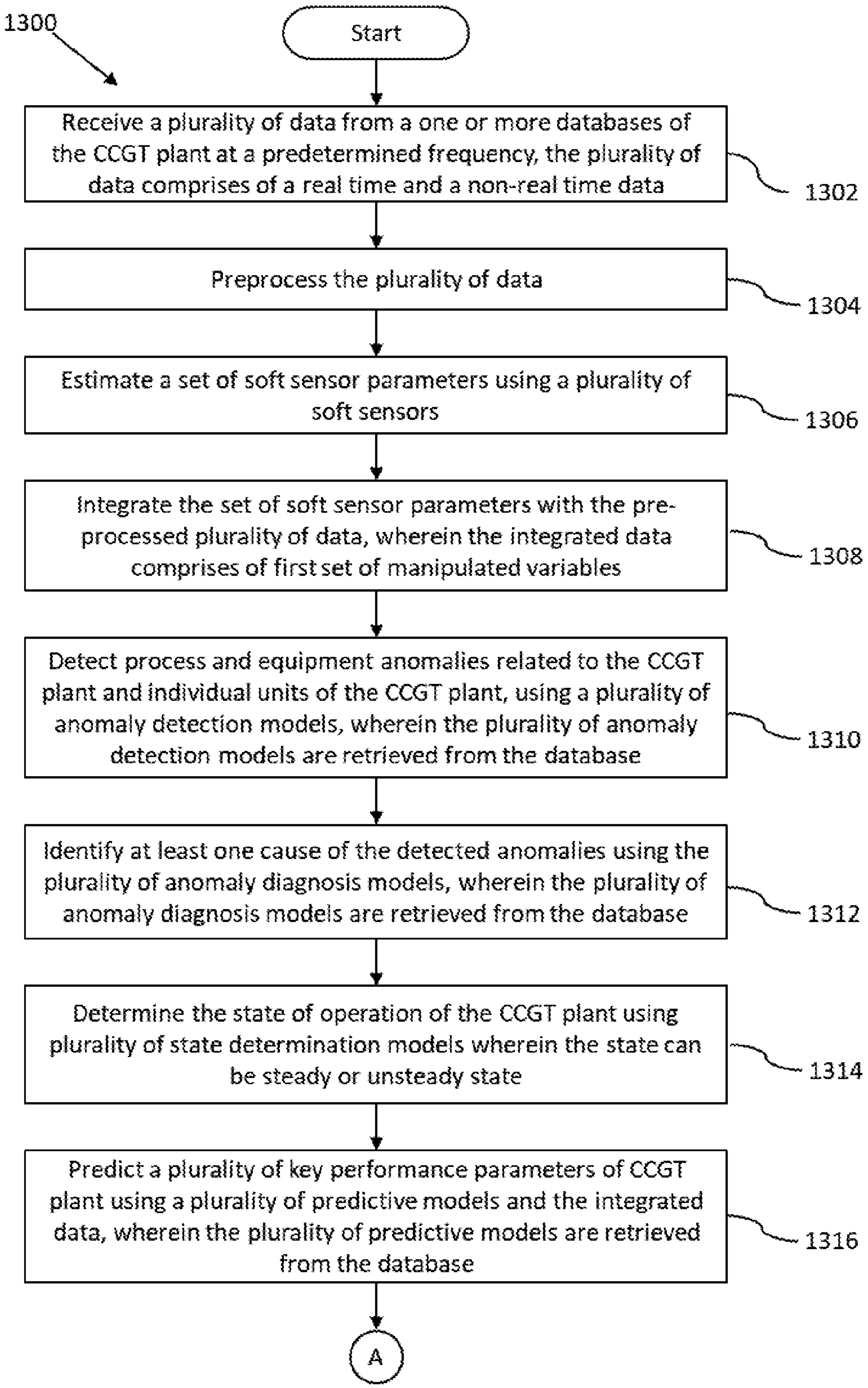
FIG. 13A-13B is a flowchart for optimizing the operation of a combined cycle gas turbine according to some embodiments of the present disclosure.
Figure 13B:
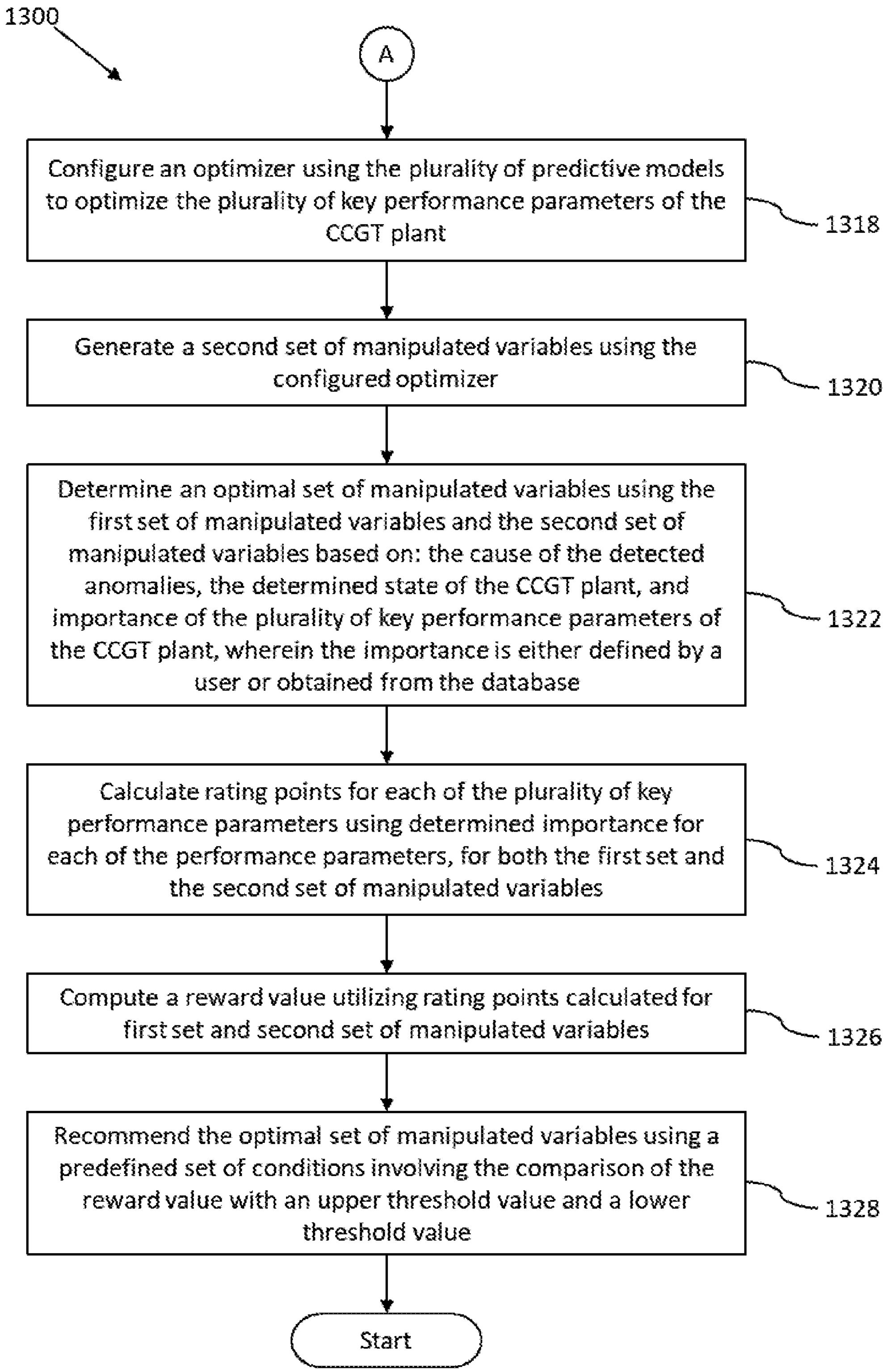

FIG. 13 shows a method for optimizing the operation of a combined cycle gas turbine (CCGT) plant 102. Initially at step 1302, a plurality of data is received from a one or more databases of the CCGT plant 102 at a predetermined frequency, wherein the plurality of data comprises of a real time and a non-real time data. Further at step 1304, the plurality of data is preprocessed. The preprocessing comprises identification and removal of outliers, imputation of missing data, synchronization and integration of data from the one or more databases. At step 1306, the set of soft sensor parameters is estimated using a plurality of soft sensors. AT step 1308, the set of soft sensor parameters is integrated with the pre-processed plurality of data, wherein the integrated data comprises of first set of manipulated variables.

Further at step 1310, the process and equipment anomalies related to the CCGT plant and individual units of the CCGT plant are detected, using a plurality of anomaly detection models. The plurality of anomaly detection models are retrieved from the model repository 126. In the presence of anomalies, complete operation of the system 122 is kept on hold, and an anomaly diagnosis module checks for the possible cause of system anomaly. At step 1312, at least one cause of the detected anomalies is identified using the plurality of anomaly diagnosis models. The plurality of anomaly diagnosis models is retrieved from the model repository 126. At step 1314, the state of operation of the CCGT plant is determined using plurality of state determination models wherein the state can be steady or unsteady state.

At the next step 1316, the plurality of key performance parameters of CCGT plant are predicted using a plurality of predictive models and the integrated data, wherein the plurality of predictive models are retrieved from the database. At step 1318 an optimizer is configured using the plurality of predictive models to optimize the plurality of key performance parameters of the CCGT plant 102. At step 1320, a second set of manipulated variables is generated using the configured optimization system.

At the next step 1322 an optimal set of manipulated variables is determined using the first set of manipulated variables and the second set of manipulated variables based on the cause of the detected anomalies, the determined state of the CCGT plant, and importance of the plurality of key performance parameters of the CCGT plant. The importance is either defined by a user or obtained from the database (422). Further, at step 1324, rating points are calculated for each of the plurality of key performance parameters using the determined importance for each of the performance parameters, for both the first set and the second set of manipulated variables. At step 1326, the reward value is computed utilizing rating points calculated for the first and the second set of manipulated variables. Finally, at step 1328, the optimal set of manipulated variables is recommended using a predefined set of conditions involving the comparison of the reward value with the upper and lower threshold values.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of improving the efficiency of combined cycle gas turbine base power plants by optimizing the manipulated variables. The embodiment, thus provides the method and system for optimizing the operation of a combined cycle gas turbine.

The embodiments of present disclosure check for the anomalous behavior of the system and define the root cause of the identified anomaly. Process optimization module get triggered only in the absence of any anomaly of the system. Furthermore, the embodiments of present disclosure identify the operational state of the CCGT plant 102 namely steady and unsteady states.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

The invention claimed is:

1. A processor implemented method for optimizing an operation of a combined cycle gas turbine (CCGT) plant, the method comprising:

receiving a plurality of data from a one or more databases of the CCGT plant at a predetermined frequency, wherein the plurality of data comprises of a real-time and a non-real-time data, wherein the real-time data is obtained from plant automation systems via a communication server;

preprocessing, via one or more hardware processors, the plurality of data;

estimating, via the one or more hardware processors, a set of soft sensor parameters using a plurality of soft sensors;

integrating, via the one or more hardware processors, the set of soft sensor parameters with the pre-processed plurality of data, wherein the integrated data comprises a first set of manipulated variables;

training, via the one or more hardware processors, a plurality of anomaly detection models and a plurality of anomaly diagnosis models using a historical data of the CCGT plant and built using statistical, machine learning and deep learning techniques including principal component analysis, Mahalanobis distance, isolation forest, random forest classifiers, one-class support vector machine, artificial neural networks, elliptic envelope and auto-encoders and Bayesian networks;

detecting, via the one or more hardware processors, process and equipment anomalies related to the CCGT plant and individual units of the CCGT plant, using the plurality of anomaly detection models, wherein the plurality of anomaly detection models are retrieved from the database;

identifying, via the one or more hardware processors, at least one cause of the detected anomalies using the plurality of anomaly diagnosis models, wherein the plurality of anomaly diagnosis models are retrieved from the database, and wherein a real-time process optimization is triggered only in an absence of the anomaly;

determining, via the one or more hardware processors, a state of the operation of the CCGT plant using a plurality of state determination models wherein the state can be steady or unsteady state;

classifying, via the one or more hardware processors, the state of the operation of the CCGT plant into the steady state and the unsteady state in real-time using a subset of the CCGT plant variables comprising a total generated power, a frequency of power generated or a rotational speed of shaft, a fuel flow rate and an inlet air flow rate using a plurality of state determination which are data-driven classifiers, wherein the unsteady state is further classified into one of a steady, load-up, load-down, start-up and shut-down state;

predicting, via the one or more hardware processors, a plurality of key performance parameters of CCGT plant using a plurality of predictive models and the integrated data, wherein the plurality of predictive models are retrieved from the database;

configuring, via the one or more hardware processors, an optimizer using the plurality of predictive models to optimize the plurality of key performance parameters of the CCGT plant;

generating, via the one or more hardware processors, a second set of manipulated variables using the configured optimizer;

determining, via the one or more hardware processors, an optimal set of manipulated variables using the first set of manipulated variables and the second set of manipulated variables based on the cause of the detected anomalies, the determined state of the CCGT plant, and an importance of the plurality of key performance parameters of the CCGT plant, wherein the importance is either defined by a user or obtained from the database, wherein the importance of the plurality of key performance parameters is defined based on instantaneous condition of the CCGT plant;

calculating, via the one or more hardware processors, rating points for each of the plurality of key performance parameters using the determined importance for each of the key performance parameters, for both the first set and the second set of manipulated variables;

computing, via the one or more hardware processors, a reward value utilizing the rating points calculated for first set and second set of manipulated variables;

choosing, via the one or more hardware processors, the optimal set of manipulated variables using a predefined set of conditions involving the comparison of the reward value with an upper threshold value and a lower threshold value; and providing the optimal set of manipulated variables to optimize the operation of the CCGT plant for generation of electric power.

2. The method of claim 1, wherein a plurality of sources comprises one or more of a distributed control system (DCS), a historian, a Laboratory information management system (LIMS), a manufacturing execution systems (MES) or a manual input.

3. The method of claim 1 wherein preprocessing comprises cleaning the historical data by removal of outliers, synchronization of different data series, or identification and removal of high frequency non process related noise.

4. The method of claim 1, further comprising performing simulation tasks on the CCGT plant in an offline mode, thereby assisting a real-time optimization process in generating and simulating specific test cases using high fidelity physics-based and data-driven models.

5. The method of claim 1, further comprising providing real-time output from a fuel composition sensor and a calorific value meter to the process of determining the optimal set of manipulated variables.

6. The method of claim 1, wherein the plurality of anomaly detection models are data-driven models, utilizing one or more of a specific subset of variables to compute an anomaly score for each of the individual units and the entire CCGT plant, wherein the anomaly score summarizes the operation of each of the individual units and the entire CCGT plant in real-time.

7. The method of claim 1, wherein the plurality of anomaly diagnosis models are data-driven models, utilizing one or more of the specific subset of variables to identify the cause of the anomaly for each of the individual units and the entire CCGT plant.

8. The method of claim 1, wherein the plurality of key performance parameters comprises, thermal efficiency, generated power, frequency of generated power, exhaust gas temperature, cost of operation and pollutants in exhaust gas.

9. The method of claim 1, wherein the predefined set of conditions comprising:

choosing the first set of manipulated variables as the optimal set of manipulated variables if the reward value is less than the lower threshold value, choosing the second set of manipulated variables as the optimal set of manipulated variables if the reward value is more than the upper threshold value, and choosing a manipulated variable which is a functional relationship between the first and second set of manipulated variables as the optimal set of manipulated variables if the reward value is between the upper threshold value and the lower threshold value, wherein, the functional relationship is defined based on the physical relationship between the plurality of key performance parameters and each of the manipulated variables.

10. The method of claim 1, wherein the manipulated variables comprises: a percentage of opening of one or more fuel control valves, an opening of an inlet guide vane (IGV), a turbine cooling flow rate, a proportion of mixing of different fuels and a percentage opening of steam control valves.

11. The method of claim 1, wherein the plurality of soft-sensors are physics based and data-driven soft sensors, comprised of a power generated by a gas turbine, a power generated by a steam turbine, a relative humidity of inlet air after humidification, a turbine inlet temperature (TIT), and a flow rate and a temperature of the gas turbine cooling air.

12. A system for optimizing an operation of a combined cycle gas turbine (CCGT) plant, the system comprises:

an input/output interface;

one or more hardware processors;

a memory in communication with the one or more hardware processors, wherein the one or more first hardware processors are configured to execute programmed instructions stored in the memory, to:

receive a plurality of data from a one or more databases of the CCGT plant at a predetermined frequency, wherein the plurality of data comprises of a real time and a non-real time data, and wherein the real-time data is obtained from plant automation systems via a communication server;

preprocess the plurality of data;

estimate a set of soft sensor parameters using a plurality of soft sensors;

integrate the set of soft sensor parameters with the pre-processed plurality of data, wherein the integrated data comprises a first set of manipulated variables;

train a plurality of anomaly detection models and a plurality of anomaly diagnosis models using a historical data of the CCGT plant and built using statistical, machine learning and deep learning techniques including principal component analysis, Mahalanobis distance, isolation forest, random forest classifiers, one-class support vector machine, artificial neural networks, elliptic envelope and auto-encoders and Bayesian networks;

detect process and equipment anomalies related to the CCGT plant and individual units of the CCGT plant, using plurality of anomaly detection models, wherein the plurality of anomaly detection models are retrieved from the database;

identify at least one cause of the detected anomalies using the plurality of anomaly diagnosis models, wherein the plurality of anomaly diagnosis models are retrieved from the database, and wherein a real-time process optimization is triggered only in an absence of the anomaly;

determine a state of the operation of the CCGT plant using a plurality of state determination models wherein the state can be steady or unsteady state;

classify the state of the operation of the CCGT plant into the steady state and the unsteady state in real-time using a subset of the CCGT plant variables comprising a total generated power, a frequency of power generated or a rotational speed of shaft, a fuel flow rate and an inlet air flow rate using a plurality of state determination which are data-driven classifiers, wherein the unsteady state is further classified into one of a steady, load-up, load-down, start-up and shut-down state;

predict a plurality of key performance parameters of CCGT plant using a plurality of predictive models and the integrated data, wherein the plurality of predictive models are retrieved from the database;

configure an optimizer using the plurality of predictive models to optimize the plurality of key performance parameters of the CCGT plant;

generate a second set of manipulated variables using the configured optimizer;

determine an optimal set of manipulated variables using the first set of manipulated variables and the second set of manipulated variables based on the cause of the detected anomalies, the determined state of the CCGT plant, and an importance of the plurality of key performance parameters of the CCGT plant, herein the importance is either defined by a user or obtained from the database, wherein the importance of the plurality of key performance parameters is defined based on instantaneous condition of the CCGT plant;

calculate rating points for each of the plurality of key performance parameters using the determined importance for each of the key performance parameters, for both the first set and the second set of manipulated variables;

compute a reward value utilizing the rating points calculated for first set and second set of manipulated variables;

recommend the optimal set of manipulated variables using a predefined set of conditions involving the comparison of the reward value with an upper threshold value and a lower threshold value; and provide the optimal set of manipulated variables to optimize the operation of the CCGT plant for generation of electric power.

13. The system of claim of claim 12, further comprising a fuel composition sensor and a calorific value meter at the inlet of a fuel control valve to provide a real-time value of a fuel density and a calorific value of a fuel.

14. One or more non-transitory machine readable information storage mediums comprising one or more instructions which when executed by one or more hardware processors cause:

receiving a plurality of data from a one or more databases of the combined cycle gas turbine (CCGT) plant at a predetermined frequency, wherein the plurality of data comprises of a real time and a non-real time data, and wherein the real-time data is obtained from plant automation systems via a communication server;

preprocessing the plurality of data;

estimating, a set of soft sensor parameters using a plurality of soft sensors;

integrating the set of soft sensor parameters with the pre-processed plurality of data, wherein the integrated data comprises a first set of manipulated variables;

training a plurality of anomaly detection models and a plurality of anomaly diagnosis models using a historical data of the CCGT plant and built using statistical, machine learning and deep learning techniques including principal component analysis, Mahalanobis distance, isolation forest, random forest classifiers, one-class support vector machine, artificial neural networks, elliptic envelope and auto-encoders and Bayesian networks;

detecting process and equipment anomalies related to the CCGT plant and individual units of the CCGT plant, using the plurality of anomaly detection models, wherein the plurality of anomaly detection models are retrieved from the database;

identifying at least one cause of the detected anomalies using the plurality of anomaly diagnosis models, wherein the plurality of anomaly diagnosis models are retrieved from the database, and wherein a real-time process optimization is triggered only in an absence of the anomaly;

determining, via the one or more hardware processors, a state of the operation of the CCGT plant using a plurality of state determination models wherein the state can be steady or unsteady state;

classifying the state of the operation of the CCGT plant into the steady state and the unsteady state in real-time using a subset of the CCGT plant variables comprising a total generated power, a frequency of power generated or a rotational speed of shaft, a fuel flow rate and an inlet air flow rate using a plurality of state determination which are data-driven classifiers, wherein the unsteady state is further classified into one of a steady, load-up, load-down, start-up and shut-down state;

predicting a plurality of key performance parameters of CCGT plant using a plurality of predictive models and the integrated data, wherein the plurality of predictive models are retrieved from the database;

configuring an optimizer using the plurality of predictive models to optimize the plurality of key performance parameters of the CCGT plant;

generating a second set of manipulated variables using the configured optimizer;

determining an optimal set of manipulated variables using the first set of manipulated variables and the second set of manipulated variables based on the cause of the detected anomalies, the determined state of the CCGT plant, and an importance of the plurality of key performance parameters of the CCGT plant, wherein the importance is either defined by a user or obtained from the database, wherein the importance of the plurality of key performance parameters is defined based on instantaneous condition of the CCGT plant;

calculating rating points for each of the plurality of key performance parameters using the determined importance for each of the key performance parameters, for both the first set and the second set of manipulated variables;

computing a reward value utilizing the rating points calculated for first set and second set of manipulated variables;

recommending the optimal set of manipulated variables using a predefined set of conditions involving the comparison of the reward value with an upper threshold value and a lower threshold value; and providing the optimal set of manipulated variables to optimize the operation of the CCGT plant for generation of electric power.

* * * * *